United States Patent
Livingston

(10) Patent No.: US 7,633,630 B2
(45) Date of Patent: Dec. 15, 2009

(54) IMAGE AMPLIFYING, SERVO-LOOP CONTROLLED, POINT DIFFRACTION INTEROMETER

(75) Inventor: Peter Y. M. Livingston, Palos Verdes Estates, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 230 days.

(21) Appl. No.: 11/501,644

(22) Filed: Aug. 9, 2006

(65) Prior Publication Data

US 2008/0037030 A1    Feb. 14, 2008

(51) Int. Cl.
*G01B 9/02* (2006.01)
*G01D 5/36* (2006.01)

(52) U.S. Cl. .................... 356/521; 250/237 G
(58) Field of Classification Search ........... 356/521; 250/237 G
See application file for complete search history.

(56) References Cited

U.S. PATENT DOCUMENTS

| | | | | |
|---|---|---|---|---|
| 5,822,066 | A * | 10/1998 | Jeong et al. | 356/521 |
| 6,452,146 | B1 * | 9/2002 | Barchers | 250/201.9 |
| 7,283,252 | B2 * | 10/2007 | Kato | 356/515 |
| 7,336,371 | B1 * | 2/2008 | Haidner et al. | 356/515 |
| 2003/0234970 | A1 * | 12/2003 | Phillips et al. | 359/291 |
| 2006/0232866 | A1 * | 10/2006 | Sai et al. | 359/849 |
| 2007/0176077 | A1 * | 8/2007 | Barchers | 250/201.9 |
| 2008/0037030 | A1 * | 2/2008 | Livingston | 356/521 |

OTHER PUBLICATIONS

Birch et al. "Real-time optical aberration correction with a ferroelectric liquid-crystal spatial light modulator" Applied Optics vol. 37, No. 11. Apr. 10, 1998. pp. 2164-2169.*
Chung et al. "Adaptive-optics system with liquid-crystal phase-shift interferometer" Applied Optics. vol. 45, No. 15. May 20, 2006. pp. 3409-3414.*
Bharmal el al. "Near-focus high-sensitivity wavefront sensing" Mon. Not. R. Astron. Soc. 360. 2005. 1325-1332.*

* cited by examiner

*Primary Examiner*—Patrick J Connolly
(74) *Attorney, Agent, or Firm*—Carmen Patti Law Group, LLC

(57) ABSTRACT

An apparatus in one example has: first and second Fourier transform lenses, the first Fourier transform lens receiving an incident plane wavefront and focusing the plane wavefront down to a focal point in a focal plane, and the second Fourier transform lens reimaging the focused down plane wavefront to an output plane wavefront; a bead located substantially at the focal point and that is illuminated by radiation that comes in from the first lens, the bead reradiating a spherical wave, which interferes with light that passes around the bead to produce a diffraction pattern; an array of controllable light transmissive elements that support the bead in the focal plane; and a null seeking servomechanism for assigning an electrical value of phase departure of the incident plane wavefront from a reference thereof, the null seeking servomechanism controlling the light transmissive elements to produce phase shifts in light that passes around the bead to thereby remove aberrations in the incident plane wavefront.

20 Claims, 6 Drawing Sheets

Object

- 1000 modes—32 x 32 pixel image
- a = 150 microns, radius.

$I_1$

Medium spatial frequencies reproduced

92% reproduction

IMAGE AMPLIFYING, SERVO-LOOP CONTROLLED, POINT DIFFRACTION INTEROMETER

TECHNICAL FIELD

The invention relates generally to interferometers and, more specifically, to servo controlled interferometers.

BACKGROUND

Typically, conventional interferometers, based upon the Michelson design for example, employ a single coherent light source (at an object plane) which is split into a test wave and a reference wave. The test wave passes through the optic under test and the reference wave avoids that optic. The test and reference waves are recombined to generate an interference pattern or interferogram. Analysis of the interferogram, with for example Zernike polynomials, indicates the presence of aberrations.

The reference wave of an interferometer should be "perfect"; that is, it should be simple and well characterized, such as a plane or spherical wave. Unfortunately, beam splitters and other optics through which the reference beam passes introduce some deviations from perfection. Thus, the interferogram never solely represents the condition of the test optic. It always includes some artifacts from the optical system through the reference wave passes. While these artifacts can in theory be separated from the interferogram, it is usually impossible to know that a subtraction produces a truly clean interferogram.

To address this problem, an interferometer of relatively simple design, the "point diffraction interferometer", has been developed. These devices generate reference waves through a point (a pinhole) in the path the test beam. The light diffracting around the occluding disk or through the pinhole, unencumbered by beam splitters, mirrors, lens, or other optical elements, closely approximates the ideal spherical wave desired for a reference wave.

Furthermore, it is also desirable for such interferometers and interferometric instruments to produce high contrast interferograms which enable precision measurements. To this end it is desirable to utilize a "perfect" reference wave; that is it should be simple and well characterized, such as a spherical wave. Perfect reference waves are typically produced by incident-light diffraction at a small, central pinhole, or around an occluding disk.

Additionally, it is also desirable to ensure precise control of the phase shifting process for even greater measurement precision and accuracy. Accurate phase shifting, however, is not easily accomplished. In particular, the common phase shifting method of translating mirrors in a direction of the optical path is difficult due to the exaggerated effects of even minute mirror motions. Various other methods and arrangements have been developed to facilitate and improve phase shifting. For example, a Wollaston prism and a quarter wave plate may be used to shear light into two beams. A wedge glass is then used to vary the optical path difference of one of the beams relative to the other to thereby impart a phase shift.

One difficulty with the point diffraction interferometer is that phase shifting between the reference and test waves is not easily accomplished. Unfortunately, phase shifting is often necessary to improve the accuracy of the instrument.

Thus, there is a need in the art for an improved low light level pulsed phase measurement system.

SUMMARY

One embodiment of the present method and apparatus encompasses an apparatus. The apparatus may comprise: first and second Fourier transform lenses, the first Fourier transform lens receiving an incident plane wavefront and focusing the plane wavefront down to a focal point in a focal plane, and the second Fourier transform lens reimaging the focused down plane wavefront to an output plane wavefront; a bead located substantially at the focal point, the bead being illuminated by radiation coming in from the first lens, the bead reradiating a spherical wave, which interferes with light that passes around the bead to produce a diffraction pattern; an array of controllable light transmissive elements that support the bead in the focal plane; and a null seeking servomechanism for assigning an electrical value of phase departure of the incident plane wavefront from a reference thereof, the null seeking servomechanism controlling the light transmissive elements to produce phase shifts in light that passes around the bead to thereby remove aberrations in the incident plane wavefront.

Another embodiment of the present method and apparatus encompasses a method. The method may comprises: forming a loop with a point diffraction interferometer, a detector array, and a processor; inputting an incident plane wavefront to the point diffraction interferometer; changing, via the processor, detection signals from the detector array into drive signals for light transmissive elements in the point diffraction interferometer; and using the drive voltages to cause the light transmissive elements to compensate for aberrations in the incident plane wavefront.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

In general terms embodiments of the present method and apparatus may have first and second Fourier transform lenses. The first Fourier transform lens may receive an incident plane wavefront and focus the plane wavefront down to a focal point in a focal plane. The second Fourier transform lens may reimage the focused down plane wavefront to an output plane wavefront. A bead may be located substantially at the focal point and may be illuminated by radiation that comes in from the first lens. The bead radiates a spherical wave, which interferes with light that passes around the bead to produce a diffraction pattern. An array of controllable light transmissive elements may support the bead in the focal plane, the array of controllable light transmissive elements being controlled such that phase errors are substantially eliminated to thereby remove aberrations in the incident plane wavefront.

Embodiments of the present method and apparatus provide a low light level pulsed phase measurement system. Prior schemes for low-light level pulsed phase measurements suffered from optical complexity and possible resolution loss resulting from low signal strength. The present embodiments overcome these drawbacks by employing a simple point-diffraction interferometer supplemented by a multimode fiber preamplifier and an electronic means for fringe tracking. Multimode fiber image amplification exists and is a technology with a resolution capability that matches this application. Alignment is required for phase tilt removal.

Figure 1:
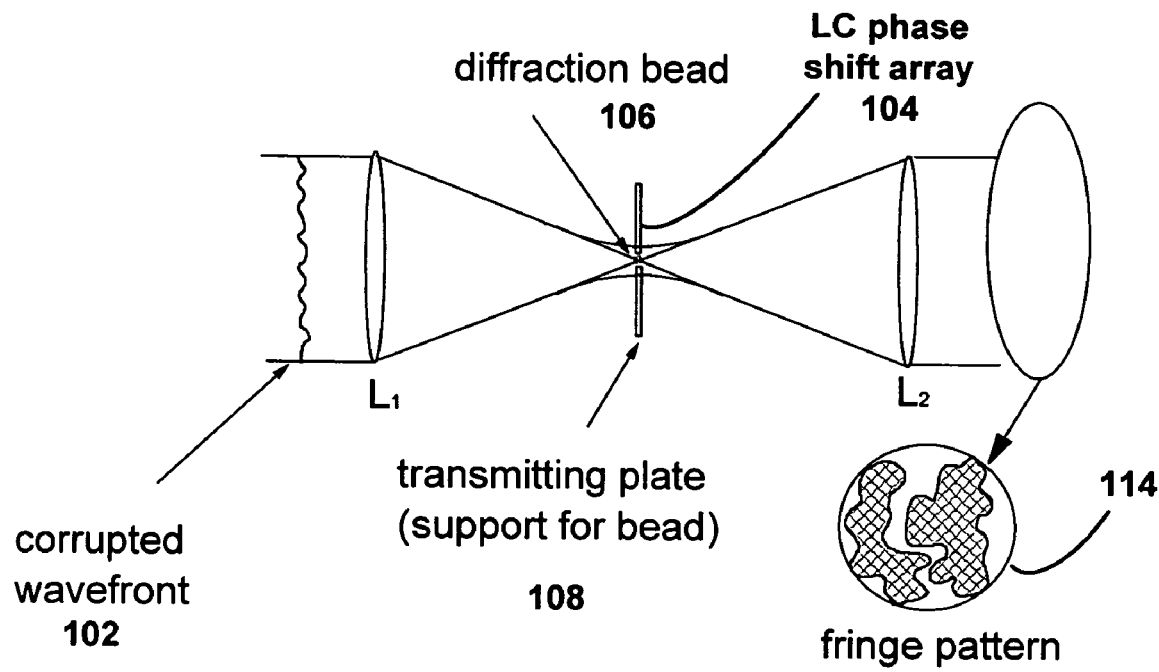
FIG. 1 depicts a point diffraction interferometer according to an embodiment of the present apparatus.

As depicted in FIG. 1 in a point diffraction interferometer the interferometer recasts the entrance pupil plane 102 onto a detector array 104 with an interference pattern superimposed. An attenuated version of the incident corrupted wavefront interferes with a reference wavefront that is a convolution of the aberrated wavefront with the small central aperture. In this embodiment lenses L1 and L2 are matched. A diffraction bead 106 (hole) has a dimension of NA times $\lambda f/D$ where $\lambda$ is the mean light wavelength, f, the lens focal length and D is its diameter. The diffraction bead 106 is supported by a transmission or support plate 108.

The bead 106 radiates a spherical reference wave that interferes with the radiation passing through the support plate 108 around the bead 106. The interferometer is self-referencing and is insensitive to thermal and vibrational disturbances. However, wavefront tilt must be removed for proper operation of the device.

A point diffraction interferometer has two lenses which are Fourier transform lenses. These lenses take a plane wavefront, focus it down and reimage it to another plane wavefront. The bead at the focal point is illuminated by radiation that comes in from the first lens, and radiates a spherical wave, which interferes with light that passes around the bead to produce a diffraction pattern 114 in the far field. If the wavefront is disturbed the diffraction pattern will show that disturbance.

Thus it is the type of interferometer that will measure the disturbance of an input wavefront relative to the little spherical wave that is emitted by the bead 106. This little spherical bead 106 radiates this clean reference wave which interferes with light that comes into the device.

If a corrupted wavefront is brought to focus in the lens focal plane, there will be a central order with various kinds of secondary irradiation in the form of rings or spots that represent the Fourier transform of the spatial disturbances on the incident wave. The focal plane of a lens is the Fourier transform plane, that is, whatever spatial frequencies that modify the incident wavefront will appear as interference patterns in the focal plane.

Figure 2:
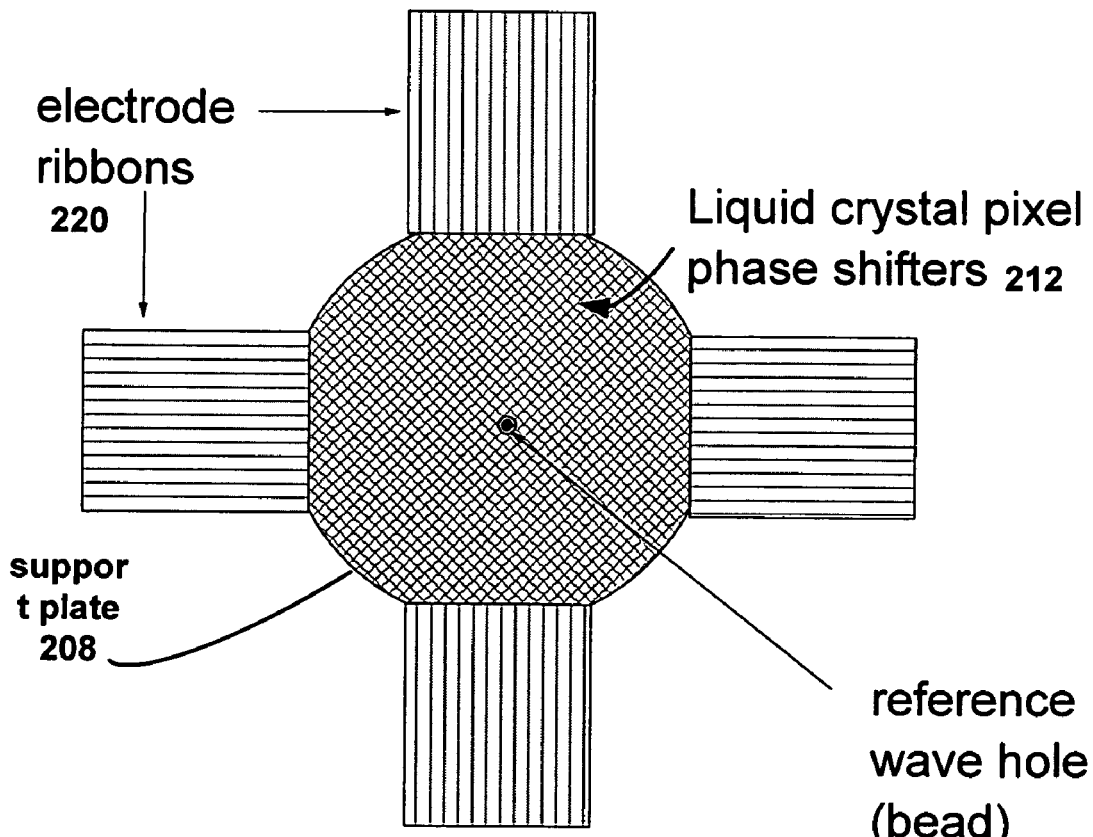
FIG. 2 depicts a transmitting plate used in the FIG. 1 apparatus.

As depicted in FIG. 2, in the embodiment of the present method and apparatus the support plate 208 may become an LC phase shifter array. When the support plate 208 is a pixilated liquid crystal array, the pixilation may be arranged on either a rectangular grid or concentric annulae about the center hole or bead 206.

Pixels 212 may be coupled to electrode ribbons 220. The pixels 212 farthest from the hole center 206 may operate on the highest spatial frequency phase disturbance. The pixels 212 may be electronically arranged to correspond to various aberration species, such as, spherical aberration, coma, etc. The purpose of electronically controlling the phase shift is to create a direct electrical measurement of the incident wave phase by means of the shadow pattern created on the image detector array and the subsequent processing electronics following the detector.

The bead 206 may be supported with a plane of LEDs (light emitting diodes), essentially liquid crystals which cause phase shifts. The liquid crystals are transmissive, but each element of this array may cause a phase shift of light passing through it. When the light is brought back to the original state, for example with a second collimating lens, by sampling part of the light, the phase shifts may be caused to compensate (that is to produce the Fourier transform, opposite Fourier transform of the electric field that is coming in such that the wavefront coming out of the system is uniform). This removes the aberrations.

Figure 3:
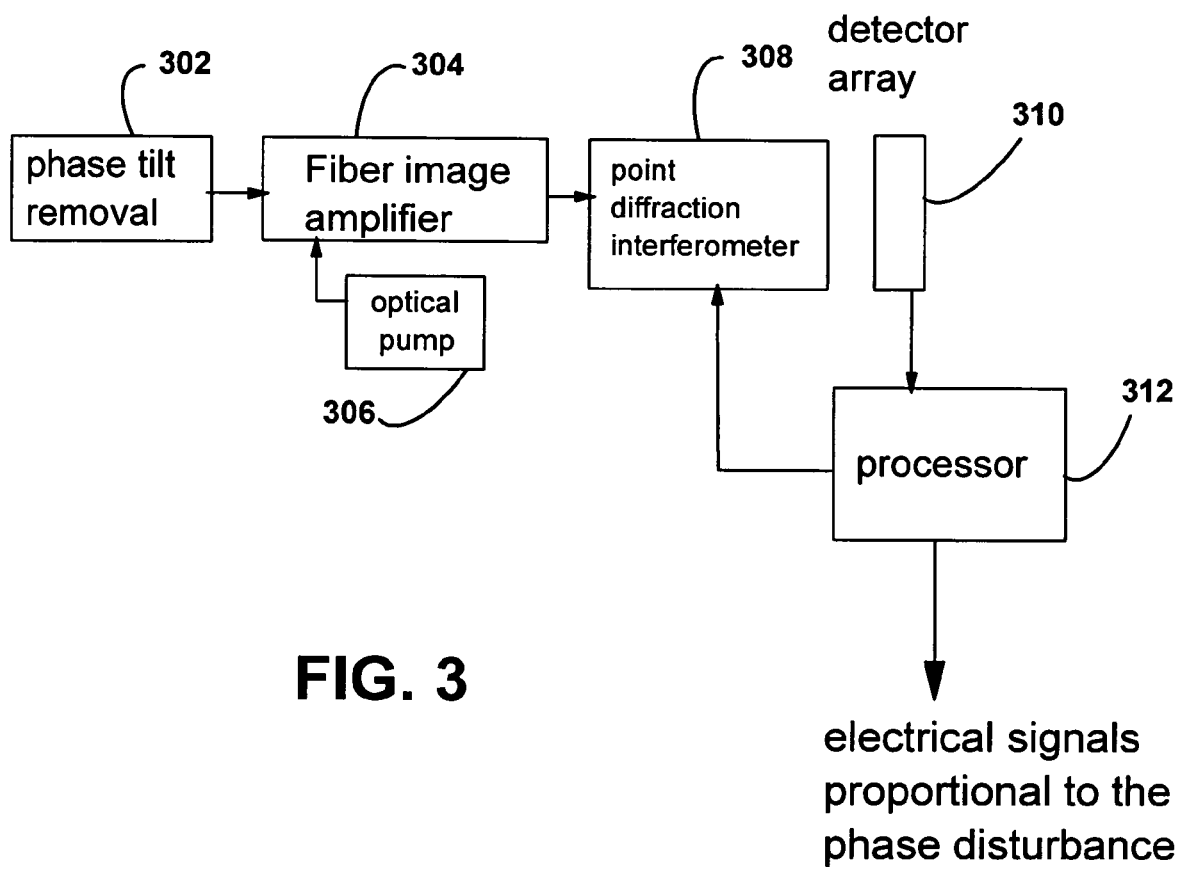
FIG. 3 depicts an image amplifying, servo-loop controlled, point diffraction interferometer according to the present apparatus.

As depicted in FIG. 3, an embodiment of the present method and apparatus may have four major components. The phase tilt removal 302 provides tilt removal which may be quad cell detection driving a fast steering mirror. The phase tilt removal unit 302 is important because interferometers of this type always need to have the tilt removed. This means that the constant phase front is tilted with respect to the optical axis. This is not a true aberration because by changing the reference the tilt may always be removed. The phase tilt removal ensures that the focal spot is aligned with the bead. The fiber image amplifier 304 may have power gains of approximately 20 may be only a few centimeters long. The phase shifts may be adjusted to create a uniform pattern on the detector 306. Electrical output, based on maintaining a uniform pattern on the detector array 306, may correspond either to a Zernike expansion of the phase error or to a rectangular phase error array across the entrance pupil plane.

The fiber image amplifier 304 (large multimode fiber, for example, several microns in diameter) may be necessary due to the losses of energy in the interferometer. The fiber image amplifier 304 amplifies the entire wavefront. The optical pump 306 provides the necessary elements so that the fiber shows gain and not loss.

The point diffraction interferometer 308, detector array 310, and processor 312 form the basic loop. The processor 312 changes the detection signals from the detector array 310 into drive voltages or signals for the pixels (LEDs) in the interferometer 308. These drive voltages cause the LEDs to compensate for the aberrations. That is, the pixels may be so configured as to produce the conjugate Fourier spectrum of the incident signal. Thus, this is a different way of taking out aberrations. Normally, in many interferometers a wavefront is produced that is a disturbed wavefront and a conjugate of the disturbed wavefront is produced. If in the original wavefront, part of the wave is advanced relative to the mean, the conjugated wavefront causes that part to be retarded relative to the mean. Therefore, the amount of the advance and retardation is the same which results in a beam with no aberration.

However in the embodiments according to the present method and apparatus, a Fourier transform is taken of a beam having advanced and retarded portions. This results in a spectrum having a central lobe and some secondary lobes. These lobes are in fact electric fields that have a brightness and a phase associated therewith for each lobe. The array is operated to change the phases progressing there through such that when this is taken into account the reassembled wave is uniform.

Electrical signals proportional to the phase disturbance may be use to control, for example, some upstream optics, such as an adaptive optic.

Graded index, doped multimode fibers may be utilized in the image amplifier 304. For large fibers, each mode may be a degree of freedom that corresponds to an image degree of freedom. For example a 32×32 image requires 1024 modes in a quadratic, graded index fiber. For a fiber with a NA=0.067 at a wavelength of 1 micron, the core radius of a quadratic graded index fiber must be at least 152 microns in radius. Optimum coupling will occur with an imaging lens having an F/number equal to the reciprocal of the NA or approximately 15 in this example. Resolution of multimode optical fiber amplification is satisfactory for this interferometer application.

In a basic system operation a pulse repetition rate may be a basic clock rate. For each pulse: detector signals may be digitized; the phase distribution in the focal plane may be expressed as an aberration function series with unknown coefficients; the coefficients may be fixed by comparison of the aberration function fourier transform and the detected shadow pattern; these aberration function estimates for each coefficient may be passed on to a recursive buffer; and multiple line buffer output goes to a converter that provides drive for the individual pixels from the recursion on the aberration coefficients.

In the interpulse period, the liquid crystal phase shifters may be updated. The sign of the phase change may be preserved, thereby making possible a null-seeking servoloop control. Consequently phase disturbances may be nulled in several pulse periods.

Thus, embodiments of the present method and apparatus provide a point diffraction interferometer that features a null seeking servomechanism for assignment of an electrical value to the phase departure of the test wave from its reference. A liquid crystal phase shifting element may be arranged as concentric segmented annuli about the central diffraction hole. Various simple combinations of voltages across these elements may correspond to an aberration decomposition of the phase error. An electronic processor may create signals for these elements such as to create a uniform interference across the detector plane on a several pulse basis. Therefore the electrical signals driving the elements are a direct measure of the phase aberration and may be used to drive an adaptive optic.

Figure 4:
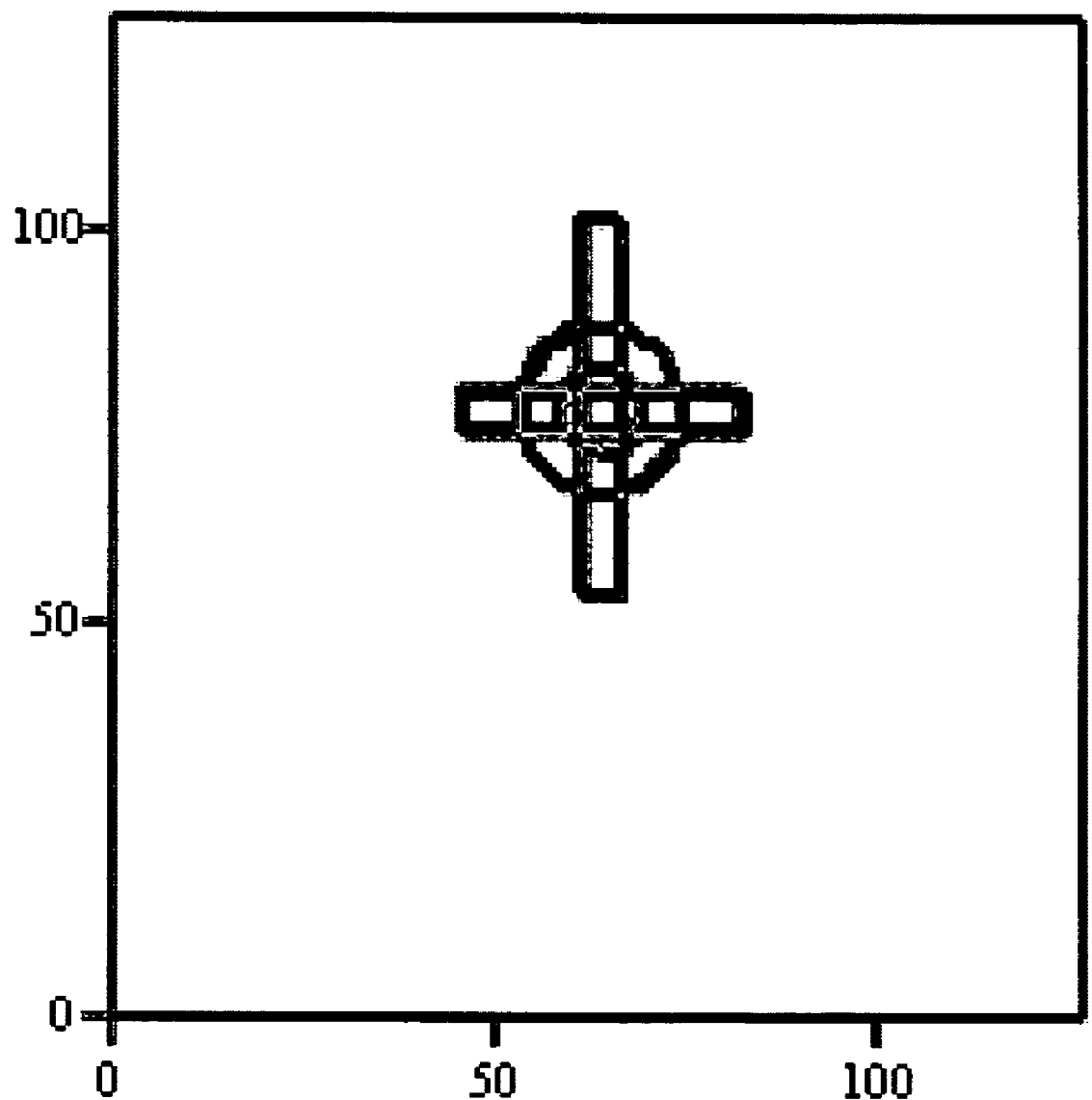
FIGS. 4 and 5 depict an example of an incident image and the image after passage through an amplifying multimode fiber, taken at a Talbot plane.
Figure 5:
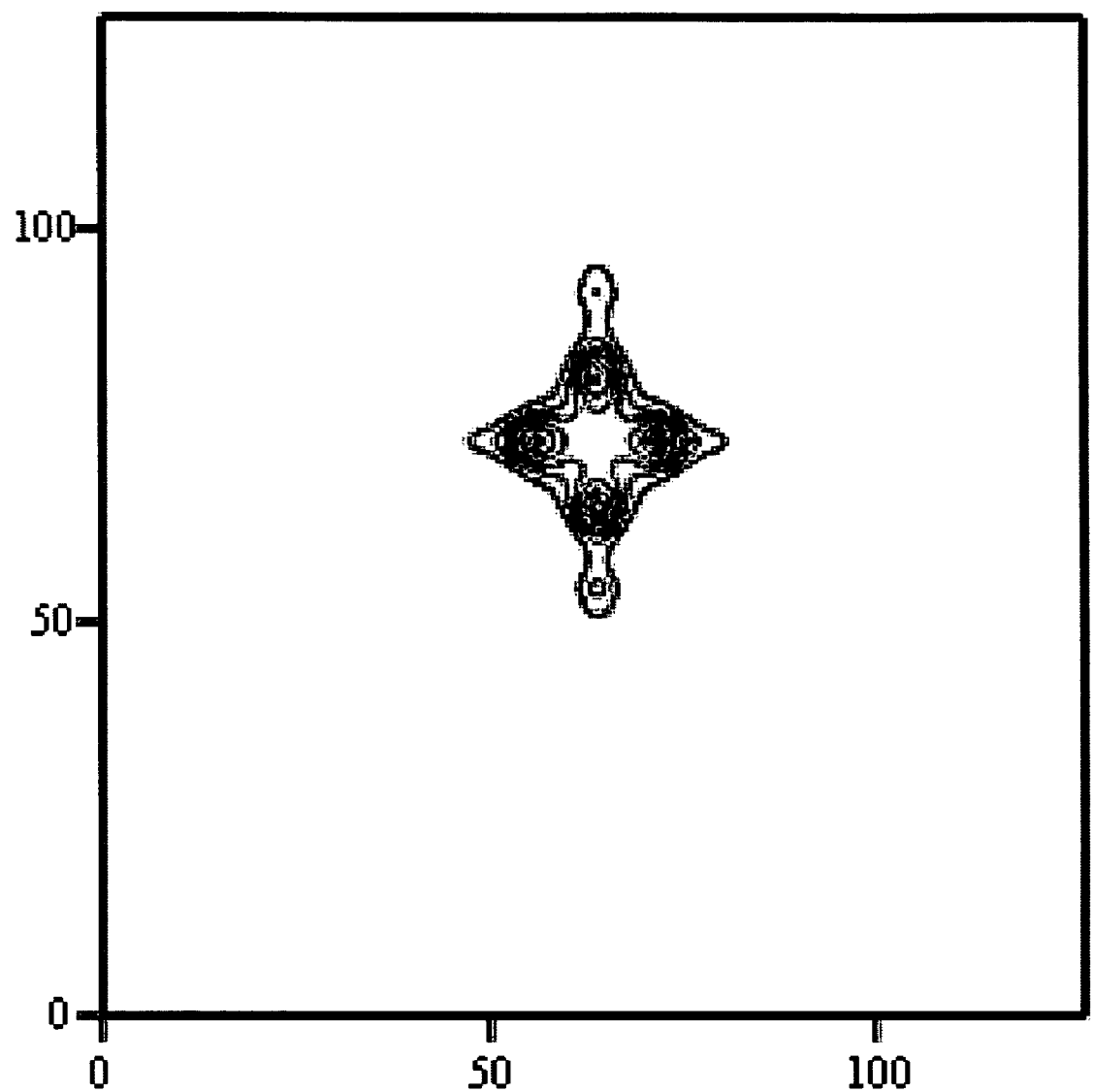
Figure 6:
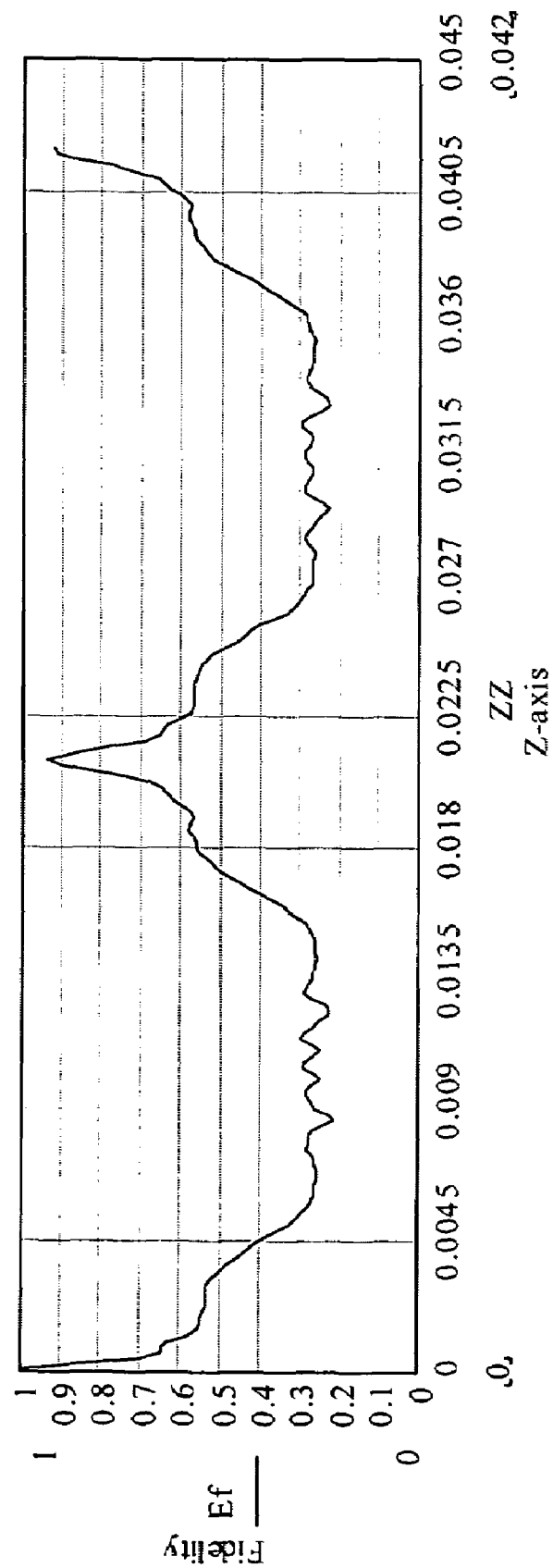
FIG. 6 illustrates the repetition of the Talbot plane throughout the length of the fiber.

FIGS. 4, 5, and 6 refer to the operation of the multimode fiber image amplifier. In this case, a large diameter fiber (~150 microns) accepts the input optical electric field, carrying the image information. This fiber is surrounded by a cladding carrying the pump light that gradually depletes along the fiber length as it transfers its energy to the fields in the fiber itself, thus amplifying the image. The large diameter of the fiber guarantees that the input optical field is divided between a great number of fiber eigen-modes each of which propagate the light at a slightly different rate, such that, at an arbitrary distance from the fiber end, the incident optical field, though amplified, is scrambled. However, at certain planes in the fiber, called Talbot image planes, the phases of all of the eigen-modes are once again in step and the electric field in the fiber at these points is an amplified replica of the incident field.

FIG. 4 shows an arbitrary input image, presented to a fiber amplifier. The fiber is 150 microns in diameter and is capable of transmitting an image at a resolution of 32×32 pixels (1024 modes).

FIG. 5 gives the resultant image at a Talbot plane. Comparing FIGS. 5 and 6 shows the loss of some high frequency information in the input image that results from the limit on the number of modes carried (1024). However, 92% of the image information is retained even in this example. If the fiber were larger, the image resolution would be greater.

FIG. 6 This plot shows how the image fidelity is reproduced at approximately every 2 cm along the fiber (Talbot plane). The image amplifier may have a length that is a multiple of this Talbot distance.

Figure 7:
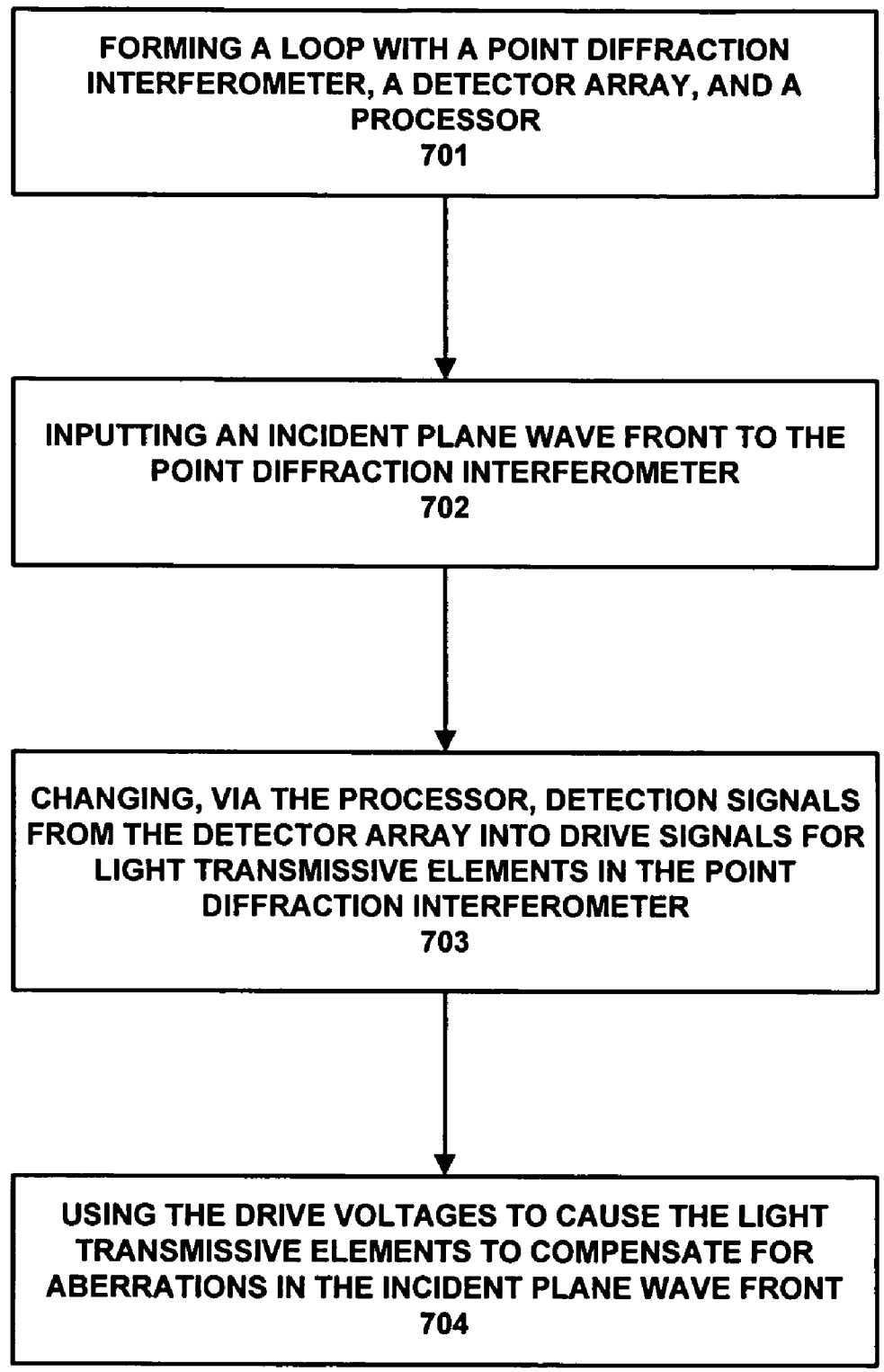
FIG. 7 is a representation of a general flow diagram according to the present method. In this embodiment of the present method.

FIG. 7 is a representation of a general flow diagram according to the present method. In this embodiment of the present method, the method may have: forming a loop with a point diffraction interferometer, a detector array, and a processor (701); inputting an incident plane wavefront to the point diffraction interferometer (702); changing, via the processor, detection signals from the detector array into drive signals for light transmissive elements in the point diffraction interferometer (703); and using the drive voltages to cause the light transmissive elements to compensate for aberrations in the incident plane wavefront (704).

The present apparatus in one example may comprise a plurality of components such as one or more of electronic components, hardware components, and computer software components. A number of such components may be combined or divided in the apparatus.

The present apparatus may employ at least one computer-readable signal-bearing media that may store software, firmware and/or assembly language, etc. The computer-readable signal-bearing medium may comprise magnetic, electrical, optical, biological, and/or atomic data storage mediums. For example, the computer-readable signal-bearing medium may comprise floppy disks, magnetic tapes, CD-ROMs, DVD-ROMs, hard disk drives, and electronic memories, etc. The computer-readable signal-bearing medium may also comprise a modulated carrier signal transmitted over a network comprising or coupled with the apparatus, for instance, at least one of a telephone network, a local area network ("LAN"), a wide area network ("WAN"), the Internet, and a wireless network.

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

We claim:

1. An apparatus, comprising:
    a first Fourier transform lens receiving an incident plane wavefront and focusing the plane wavefront down to a focal point in a focal plane;
    a bead located substantially at the focal point and that is illuminated by radiation that comes in from the first lens, the bead reradiating a spherical wave, which interferes with light that passes around the bead to produce a diffraction pattern;
    an array of controllable light transmissive elements that support the bead in the focal plane; and
    a null seeking servomechanism for assigning an electrical value of phase departure of the incident plane wavefront from a reference thereof, the null seeking servomechanism controlling the light transmissive elements to produce phase shifts in light that passes around the bead to thereby remove aberrations in the incident plane wavefront.

2. The apparatus according to claim 1, wherein the array of light transmissive elements is arranged in one of concentric rings and a rectangular grid arrangement.

3. The apparatus according to claim 1, wherein each light transmissive element causes a phase shift of light passing through it.

4. The apparatus according to claim 1, wherein the apparatus further comprises a second Fourier transform lense, and wherein the second Fourier transform lens reimages the focused down plane wavefront to an output plane wavefront.

5. The apparatus according to claim 4, wherein first and second Fourier transform lenses, array of controllable light transmissive elements and the bead form a point diffraction interferometer, wherein the null seeking servo mechanism has a detector array operatively coupled to an output of the point diffraction interferometer, and wherein an electronic processor is operatively coupled to the point diffraction interferometer and the detector array, the electronic processor creating signals for the light transmissive elements such as to create a uniform interference across the detector plane on a several pulse basis.

6. An apparatus, comprising:
first and second Fourier transform lenses, the first Fourier transform lens receiving an incident plane wavefront and focusing the plane wavefront down to a focal point in a focal plane, and the second Fourier transform lens reimaging the focused down plane wavefront to an output plane wavefront;
a bead located substantially at the focal point and that is illuminated by radiation that comes in from the first lens, the bead radiating a spherical wave, which interferes with light that passes around the bead to produce a diffraction pattern;
an array of liquid crystal elements that support the bead in the focal plane; and
an electronic processor that creates signals for the liquid crystal elements such as to create a uniform interference across the detector plane on a several pulse basis, the electrical signals that drive the liquid crystal elements being a direct measure of phase aberration of the incident plane wavefront.

7. The apparatus according to claim 6, wherein the array of liquid crystals is arranged in concentric rings.

8. The apparatus according to claim 6, wherein the array of liquid crystals is arranged in a rectangular grid arrangement.

9. The apparatus according to claim 6, wherein each of the liquid crystals is transmissive, and wherein each liquid crystal causes a phase shift of light passing through it.

10. An apparatus, comprising:
first and second Fourier transform lenses, the first Fourier transform lens receiving an incident plane wavefront and focusing the plane wavefront down to a focal point in a focal plane, and the second Fourier transform lens reimaging the focused down plane wavefront to an output plane wavefront;
a bead located substantially at the focal point and that is illuminated by radiation that comes in from the first lens, the bead radiating a spherical wave, which interferes with light that passes around the bead to produce a diffraction pattern; and
an array of controllable light transmissive elements that support the bead in the focal plane, the array of controllable light transmissive elements being controlled such that phase errors are substantially eliminated to thereby remove aberrations in the incident plane wavefront.

11. The apparatus according to claim 10, wherein the apparatus further comprises a null seeking servomechanism for assigning an electrical value of phase departure of the incident plane wavefront from a reference thereof, the null seeking servomechanism controlling the light transmissive elements to produce the phase shifts in light that passes around the bead to thereby remove aberrations in the incident plane wavefront.

12. The apparatus according to claim 10, wherein the array of light transmissive elements is arranged in concentric rings.

13. The apparatus according to claim 10, wherein the array of liquid crystals is arranged in a rectangular grid arrangement.

14. The apparatus according to claim 10, wherein each light transmissive element causes a phase shift of light passing through it.

15. The apparatus according to claim 10, wherein the first and second Fourier transform lenses, the array of controllable light transmissive elements and the bead form a point diffraction interferometer, wherein the null seeking servo mechanism has a detector array operatively coupled to an output of the point diffraction interferometer, and wherein an electronic processor is operatively coupled to the point diffraction interferometer and the detector array, the electronic processor creating signals for the light transinissive elements such as to create a uniform interference across the detector plane on a several pulse basis.

16. A method comprising:
forming a loop with a point diffraction interferometer, a detector array, and a processor;
inputting an incident plane wavefront to the point diffraction interferometer;
changing, via the processor, detection signals from the detector array into drive signals for light transmissive elements in the point diffraction interferometer; and
using the drive voltages to cause the light transmissive elements to compensate for aberrations in the incident plane wavefront; and
wherein the point diffraction interferometer further comprises: first and second Fourier transform lenses, the first Fourier transform lens receiving the incident plane wavefront and focusing the incident plane wavefront down to a focal point in a focal plane, and the second Fourier transform lens reimaging the focused down plane wavefront to an output plane wavefront; a bead located substantially at the focal point and that is illuminated by radiation that comes in from the first lens, the bead radiating a spherical wave, which interferes with light that passes around the bead to produce a diffraction pattern; and an array of controllable light transmissive elements that support the bead in the focal plane.

17. The method according to claim 16, wherein the light transmissive elements are configured to produce a conjugate Fourier spectrum of the incident signal.

18. The method according to claim 16, wherein the array of light transmissive elements is arranged in concentric rings.

19. The method according to claim 16, wherein the array of light transmissive elements is arranged in a rectangular grid arrangement.

20. The method according to claim 16, wherein each light transmissive element causes a phase shift of light passing through it.

* * * * *